United States Patent [19]
Gabel

[11] Patent Number: 5,009,447
[45] Date of Patent: Apr. 23, 1991

[54] ZERO CAMBER STEERING SUSPENSION

[76] Inventor: Dewitt Gabel, 11018 Blodgett Creek Trail, Strongsville, Ohio 44136

[21] Appl. No.: 375,711

[22] Filed: Jul. 5, 1989

[51] Int. Cl.$^5$ .............................................. B62D 17/00
[52] U.S. Cl. ..................................................... 280/661
[58] Field of Search ............... 280/772, 661, 673, 675; 180/253

[56] References Cited

U.S. PATENT DOCUMENTS

| | | | |
|---|---|---|---|
| 4,700,972 | 10/1987 | Young | 280/661 X |
| 4,835,714 | 5/1989 | Sano et al. | 280/661 X |
| 4,867,472 | 9/1989 | Ward | 280/661 |

Primary Examiner—Charles A. Marmor
Assistant Examiner—Alan M. Kagen
Attorney, Agent, or Firm—Donald A. Bergquist

[57] ABSTRACT

A suspension for a steerable or dirigible wheel for a vehicle wherein the improvement involves the providing of a horizontal pivot axis that allows the wheel's camber to be effected independently of the steering axis inclination and the caster angle. Camber may be controlled physically by a caster control arm engaging a caster control slot in the suspension yoke, or it may be controlled hydraulically by means of caster control pistons or the like.

6 Claims, 7 Drawing Sheets

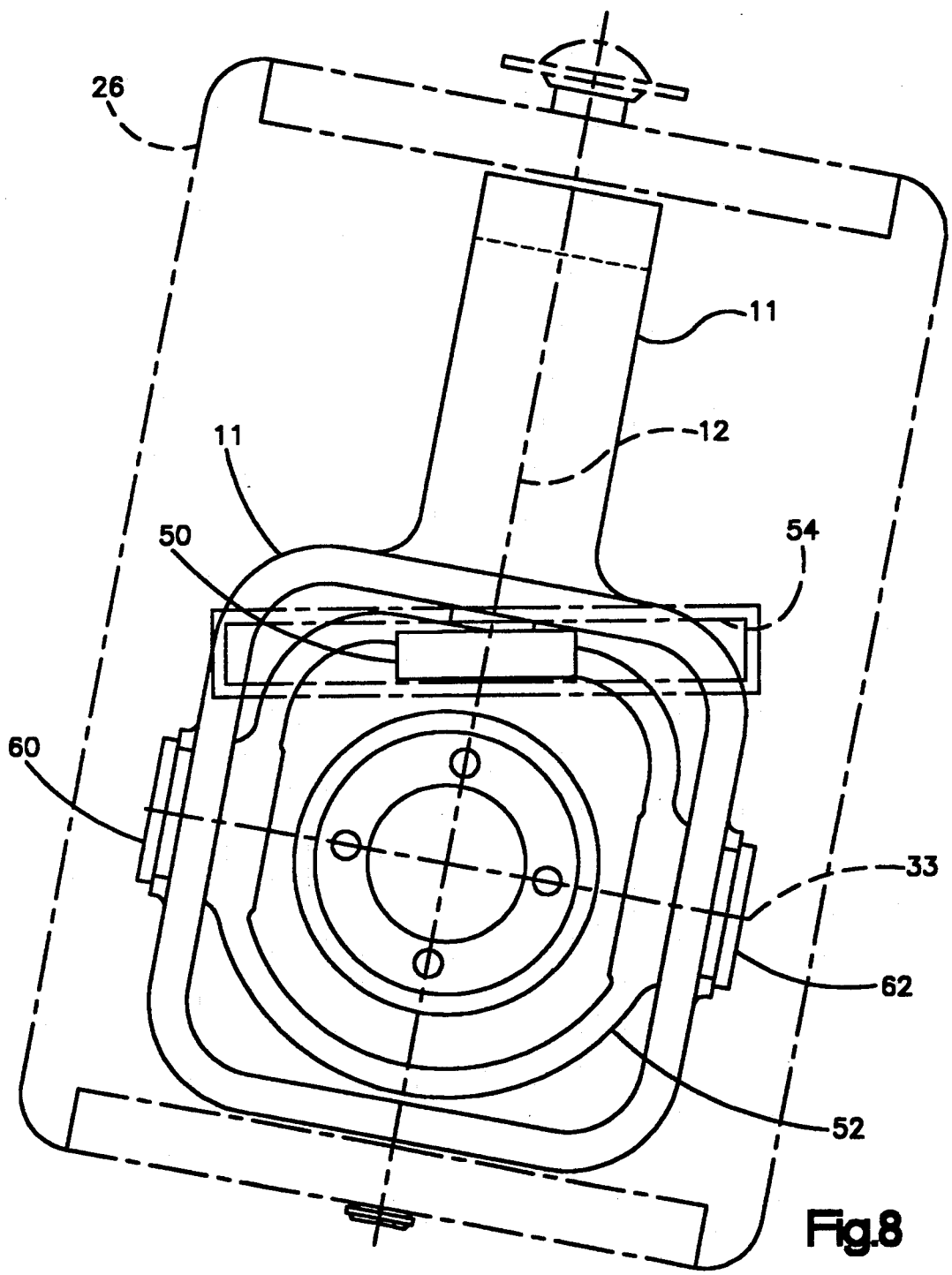

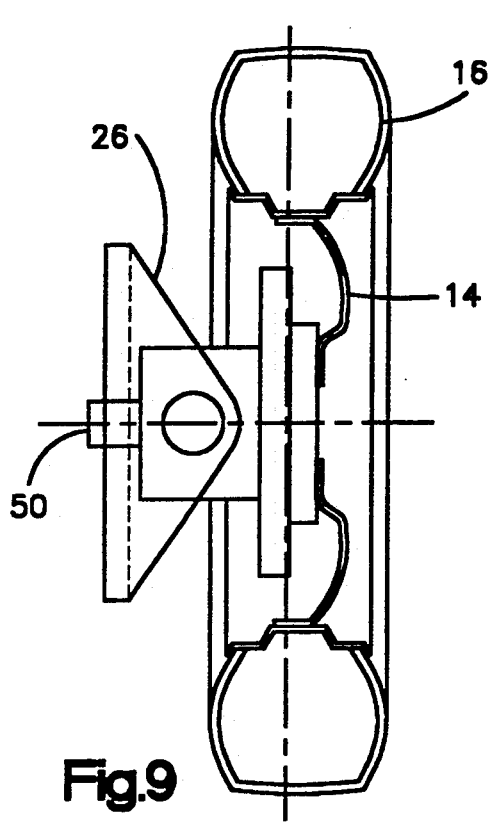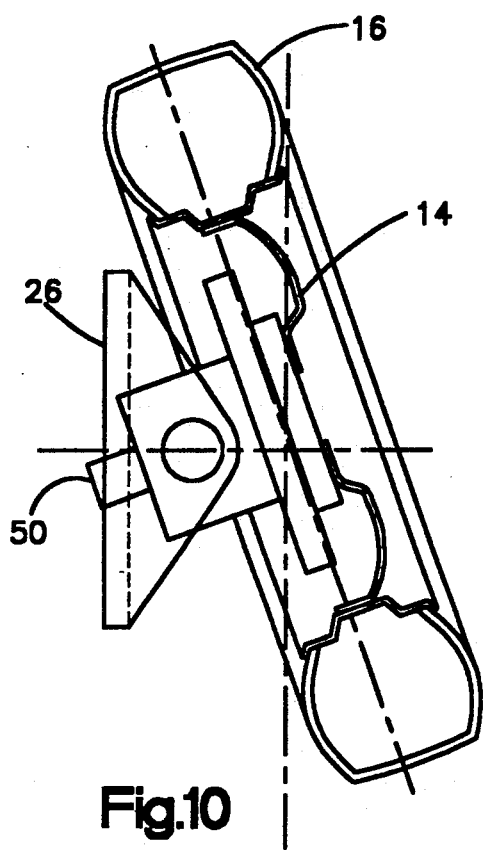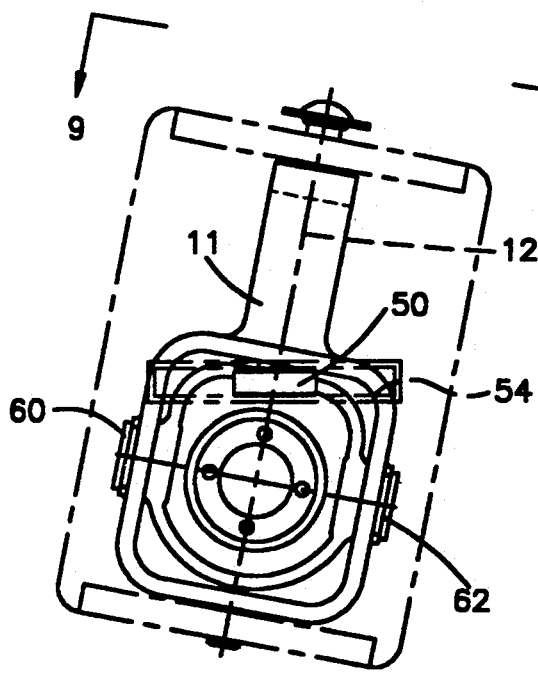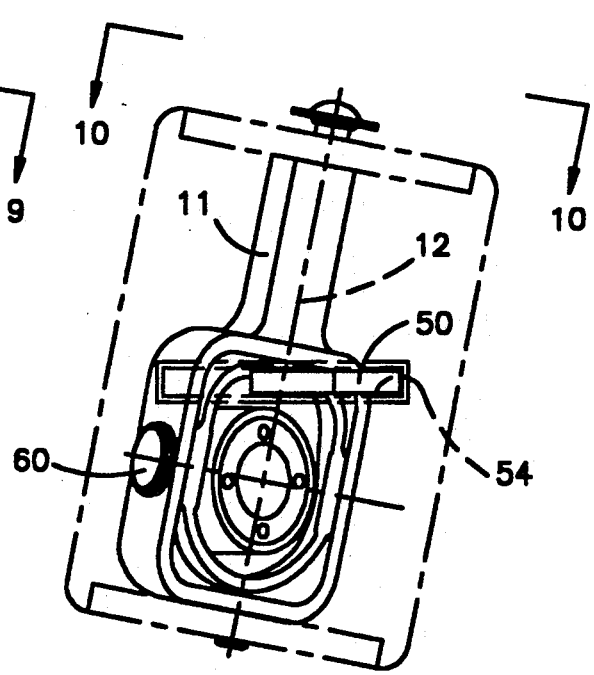

ZERO CAMBER STEERING SUSPENSION

INTRODUCTION

The general field of this invention is steering axles, primarily for use in automobiles and the like. More specifically, this invention deals with providing a suspension for a steering axle wherein the camber of the wheel on the axle is maintained at zero degrees throughout the turning range of the wheel. By the nature of this invention, it is also possible to build into a vehicle suspension a camber angle that varies as desired as the wheel is turned through its turning range. The invention is especially useful on drive wheels of a vehicle, but may also be used on vehicle wheels that are not driven.

Over the several decades during which the modern automobile has developed, many changes have been made in the design of automobile tires. The rounded cross section of early solid rubber tires made it desirable to design into the automobile suspension a camber angle that varies with turning radius, thereby allowing the tire to "lean into" a turn to improve traction between the tire and the ground.

Later, as bias-ply pneumatic tires were developed, the variable camber was still suitable for use in automobiles. The dynamics of the pneumatic tire caused a deformation of the tire during a turn, so that the tire patch—the tire tread contact with the ground—was maximized.

Present-day technology has most road vehicles riding on belted radial tires, the core of which tires comprises a wide circumferential belt, usually of multifilament steel wires or cords of other suitable material, with radial cords of fiber in the sidewalls. The sidewalls of radial tires are notoriously soft and pliable as compared with those of bias ply tires.

Because of the presence of the flat belt under the tread of belted radial tires, the greatest and most effective contact between the tire and the ground is obtained when the tire axis is parallel to the ground, with no camber whatsoever. This fact holds true whether the tire is rolling straight ahead or in a turn. It is desirable, therefore, to provide a suspension for a dirigible (steerable) wheel that maintains zero camber regardless of the steering angle. This is true for all road vehicles but it is most is especially true for high-performance vehicles such as are specifically designed for racing at high speeds. Personal testimony from race car drivers has verified the desirability of this goal. Where zero camber may not be among the design criteria for a suspension design, a camber angle that can be controlled or adjusted throughout the range of steering angles is most likely a desirable end.

It is therefore an object of this invention to provide a suspension for a dirigible wheel that maintains zero camber regardless of the angle to which the wheel is turned.

It is an object of this invention to provide a suspension for a dirigible wheel that maintains constant camber regardless of the angle to which the wheel is turned.

It is another object of this invention to provide a suspension for a dirigible wheel that maintains a camber angle that is a function of the angle to which the wheel is turned, which function may be a linear dependence or a higher-order function.

Thus it is an object of this invention to provide a dirigible or steering suspension system that provides total control of the camber angle through the entire turning angle of the dirigible wheel.

It is a further object of this invention to provide such derigible or steering suspension systems wherein the wheel is both driven and steerable.

It is an important object of this invention to remove the dependence of camber angle on both the steering axis inclination and the caster.

These and other objects of this invention will be made much more clear in the following discussion.

BRIEF DESCRIPTION OF THE DRAWINGS

FIG. 8 presents a transverse, somewhat schematic view of the cross section shown in FIG. 5.

FIG. 9 presents a top view of the dirigible wheel using the suspension of the present invention in straight-ahead driving.

FIG. 10 presents a schematic transverse view of the dirigible wheel suspension corresponding to the view in FIG. 9.

FIG. 11 presents a top view of the dirigible wheel, using the suspension of the present invention in making a left turn.

FIG. 12 presents a schematic transverse view of the dirigible wheel suspension corresponding to the view in FIG. 11.

DETAILED DESCRIPTION OF THE INVENTION

Figure 1:
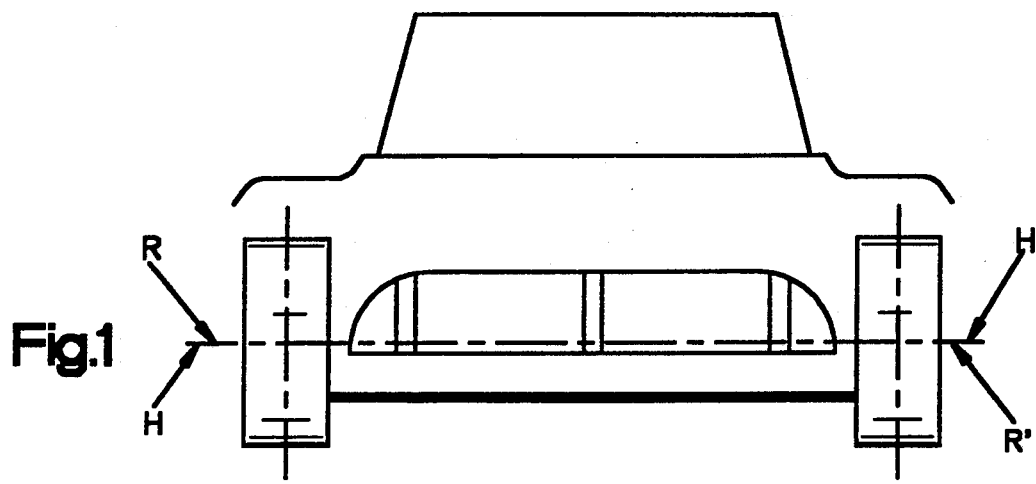
FIG. 1 presents a head-on view of an automobile showing the camber of the front wheels when driving straight.

This invention will most easily be understood by reference to the drawings attached hereto wherein the same part is identified throughout by the same reference number. It must be said that all of these drawings are somewhat schematic representations as opposed to a final design; the purpose is to more clearly show how the invention works to achieve the goals, not to propose a detailed design for production.

Several terms will be used throughout that will be defined for reference. The definitions used herein are believed to be standard in the industry.

Steering axis is the line connecting the top and bottom swivel points (mounting points) of the wheel hub assembly. These swivels may be either ball joints or the top and bottom of a king pin. The steering axis is usually inclined in both the lateral and the longitudinal directions relative to the longitudinal axis of the vehicle.

Steering axis inclination is the angling of the steering axis in the lateral plane. This angling affects the self-aligning tendency of the vehicle as the vehicle will lift slightly as the wheel is turned; in the prior art suspensions, it also causes the wheel to assume a more positive camber when turned in either direction.

Caster is the angling of the steering axis in the fore-and-aft plane. The angle is from the vertical in this plane is called the caster angle. Positive caster refers to the steering axis being tilted back at the top, thus moving the point at which the steering axis intersects with the ground to a location forward of the center of the tire contact patch. The distance between that center and the intersection is called the trail distance. It is the trial distance that is the important factor, not the angle; the angle is merely one way to create the desired trail distance. The trail distance contributes to the self-aligning tendency of the wheel and adds greatly to the stability of the vehicle when it is moving in a straight line. In the prior art technology, the caster angle also affects camber as the wheel is turned; the effect is to make the camber more positive or more negative, depending upon the direction of the turn.

Camber is the inclination of the wheel from the vertical in the lateral plane (as opposed to the inclination of the steering axis). The camber inclination, measured from the vertical, deals with actually tilting the tire. In terms of keeping a maximum amount of tire tread on the ground during all conditions of bump, rebound, and body roll, the ideal would be a zero camber. With belted radial tires, the ideal would be to maintain a zero camber during all turning operations to keep the maximum tire tread on the road surface.

For purposes of handling, comfortable ride, and ease of directional control, it is desirable to retain the steering axis inclination and the caster common to most production automobiles; these factors provide for good directional control and handling while allowing space for adequate springs and shock absorbers to provide a comfortable ride. For improved road contact, however, a steering suspension system that would provide zero camber during turning and straight-ahead travel of the wheel would be most desirable and useful.

The automobile in FIG. 1 illustrates a situation wherein the auto has zero camber during straight-ahead driving. The angle that the axis of rotation R of the wheel makes with the horizontal H is equal to the camber angle and is easier to show in these drawings, so the term 'camber angle' will apply to either of these equal angles.

Figure 2:
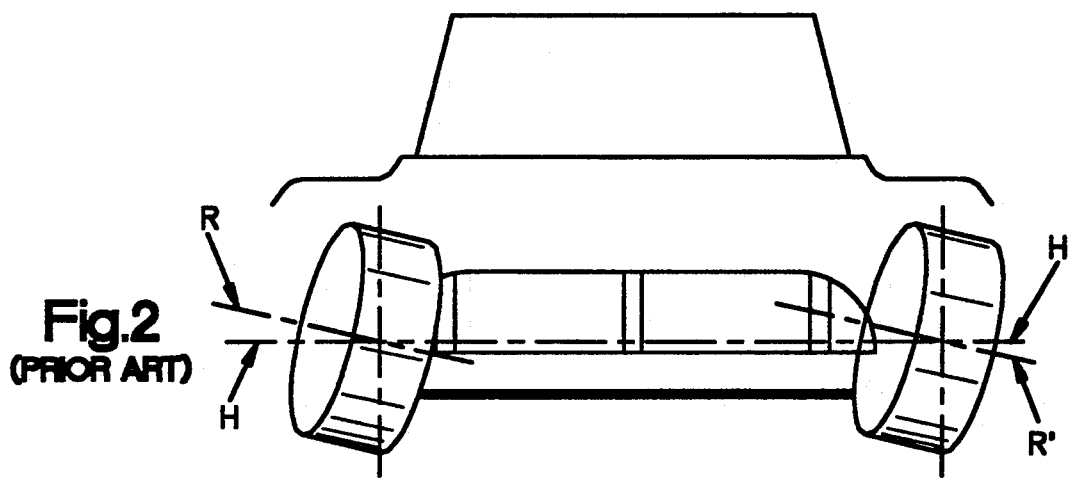
FIG. 2 presents a head-on view of an automobile showing the camber of the front wheels in a left turn using the prior art dirigible wheel suspension in common use.

The prior art situation is illustrated in FIG. 2, in which the auto is making a left turn and the tops of both dirigible wheels incline in the direction of the turn, the right wheel (on the left in the drawing) exhibiting negative camber and the left wheel (on the right in the drawing) exhibiting positive camber. From the illustration, it can be seen that the camber created by turning the wheels tends to lift one edge of the tire tread from the pavement. In actual practice, the tire deforms in a complicated manner not shown in these simplified drawings, but it can be appreciated that, especially for belted radial tires, wherein the circumferential belts around the tire are best kept flat relative to the road surface, the camber induced during turns has the potential for damaging the tire.

Figure 3:
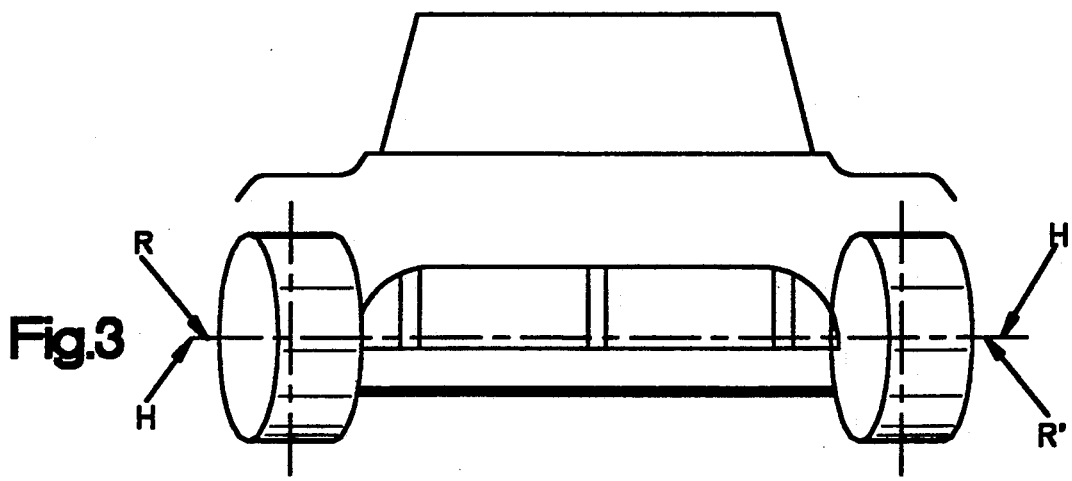
FIG. 3 presents a head-on view of an automobile showing the preferred zero camber of the front wheels in a left turn using the dirigible wheel suspension of the present invention.

The effect of the present invention is illustrated in FIG. 3, wherein the auto making a left turn exhibits zero camber angle throughout the turn, thereby keeping maximum amount of tire tread on the road surface. This result is desirable from the standpoint of maintaining maximum traction as well as from the standpoint of reducing stress on the belted radial tire.

Figure 4:
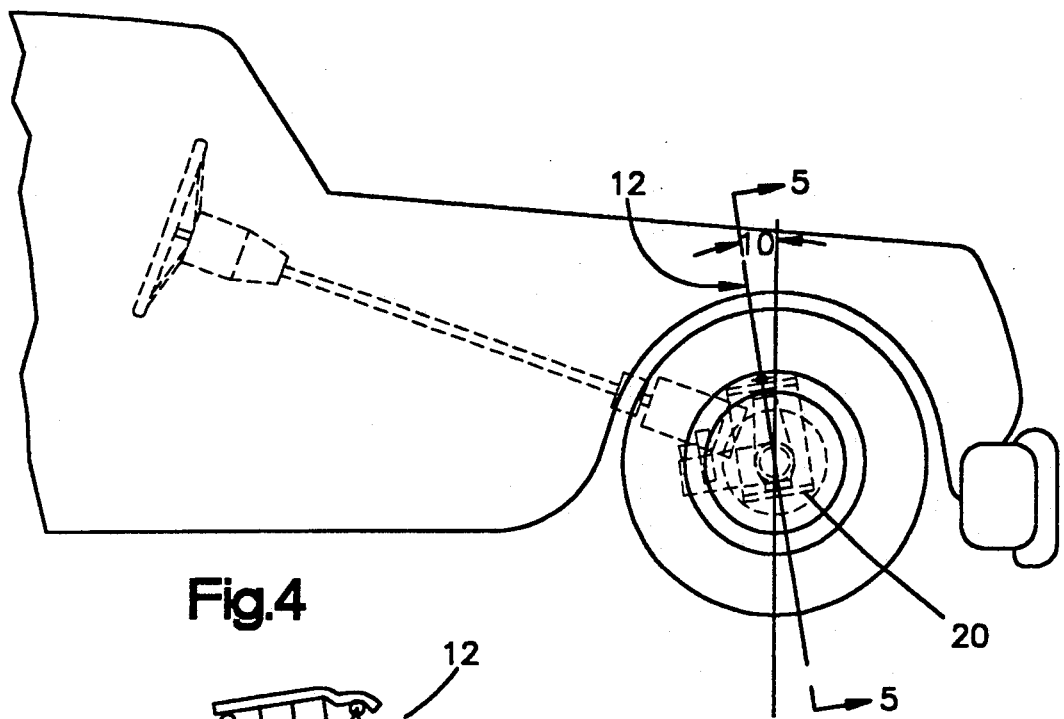
FIG. 4 presents a side view of an automobile showing the caster angle of the steering axis that produces trail distance.

The caster angle 10 of the dirigible wheel suspension system 20 is illustrated in FIG. 4. The suspension spindle 11, which rotates about the steering axis 12, is inclined rearward to provide a trail distance that aids in providing self-centering of the steering wheel. Thus, self-centering is maintained when the present invention is used.

Figure 5:
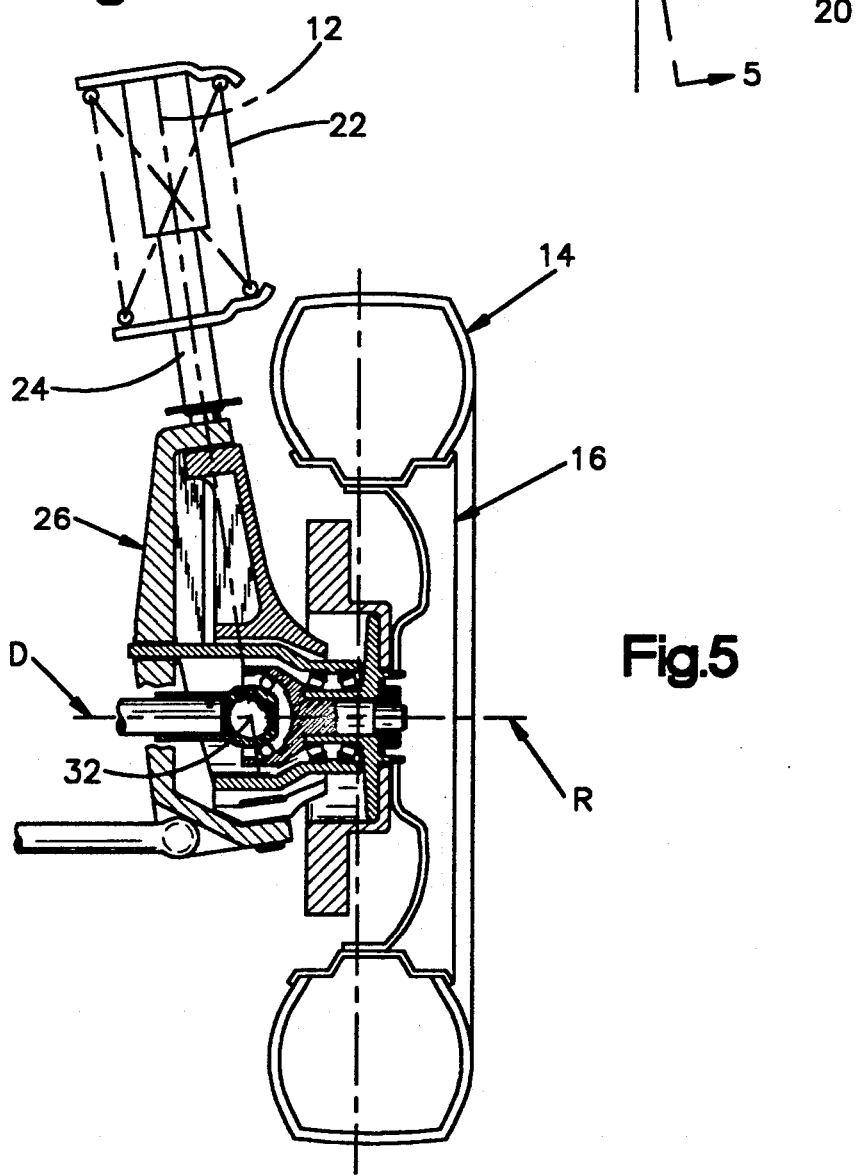
FIG. 5 presents a cross section of the dirigible wheel suspension of the present invention.

FIG. 5, a cross-section of the suspension as indicated in FIG. 4, shows the tire 14 mounted on the wheel 16, both in a vertical plane (i.e., displaying zero camber angle) on a stub axle 18. The steering axis 12 is shown to be angled inward, in conformity to industry standards for providing space for springs 22, shock absorbers 24, and the suspension yoke 26. The suspension yoke shown is that of the present invention. Although the suspension yoke is shown throughout this disclosure as a flat and somewhat rectangular member for purposes of clarity, a stronger and more lightweight design would be curved with the corners trimmed off.

Figure 6:
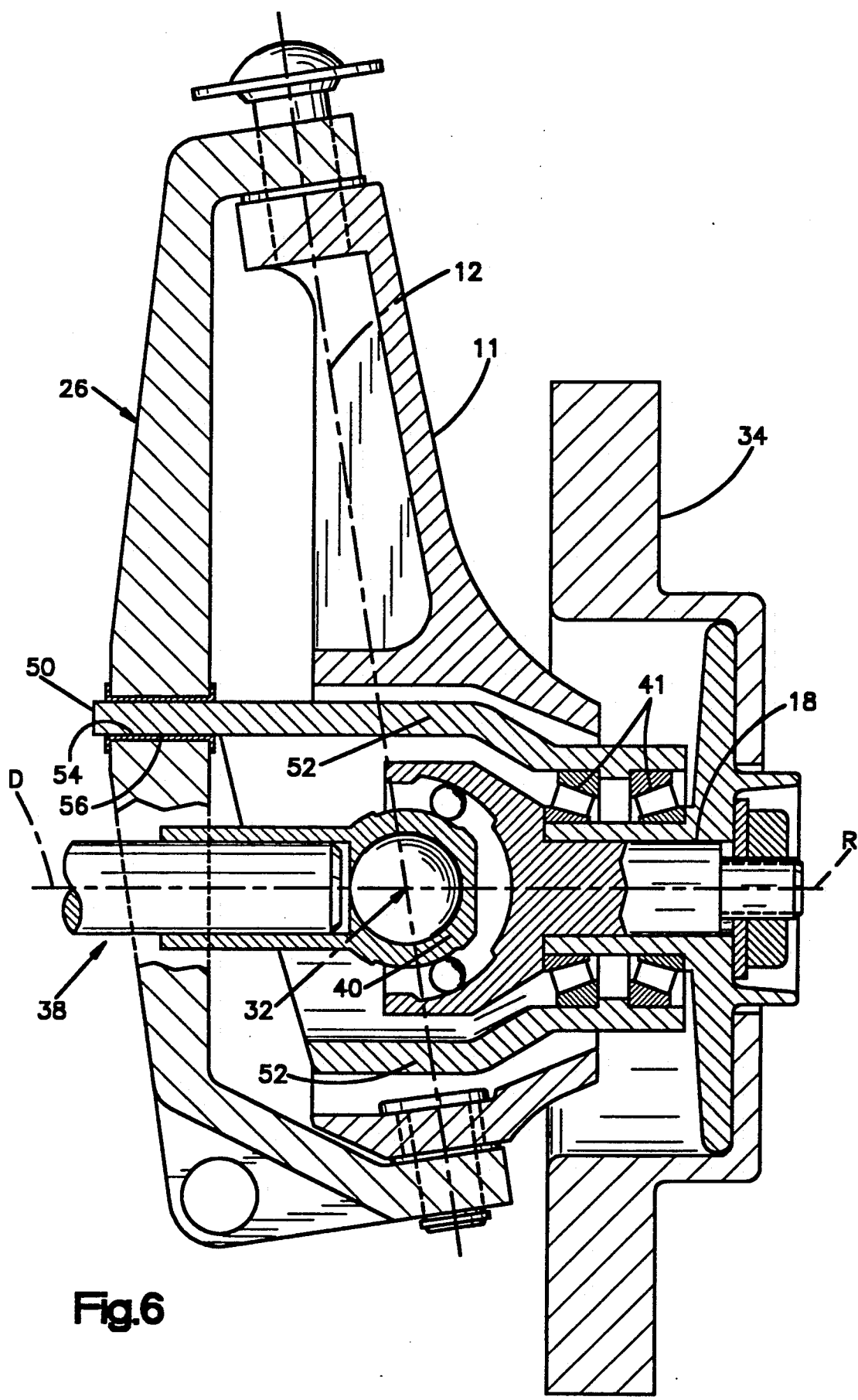
FIG. 6 presents a detailed view of the cross section shown in FIG. 5.

A detailed view of the suspension system of the present invention with the wheel removed for clarity is presented in FIG. 6. The drive shaft 38 from a source of motive power connects by means of the constant speed universal joint 40 to the stub axle 18 and wheel 16 driven thereby; standard bearings 41 are provided between the rotating members in this drive train and the non-rotating members of the suspension system. The steering axis 12 passes through the center of rotation 32 of the universal joint 40. This center of rotation, therefore, is also the center of rotation for the steering axis. These features are common to such suspensions as are in the prior art.

FIG. 6 also shows an important feature of one embodiment of the present invention. A camber control arm 50 extends from the housing 52 surrounding the universal joint 40 and is slidably maintained in a slot 54 in the suspension yoke 26. The dimensions of the slot 54 control the vertical motion of this camber control arm, holding it within fixed limits. The housing 52 pivots about a substantially vertical axis as the wheel is turned on the steering axis 12.

Figure 7:
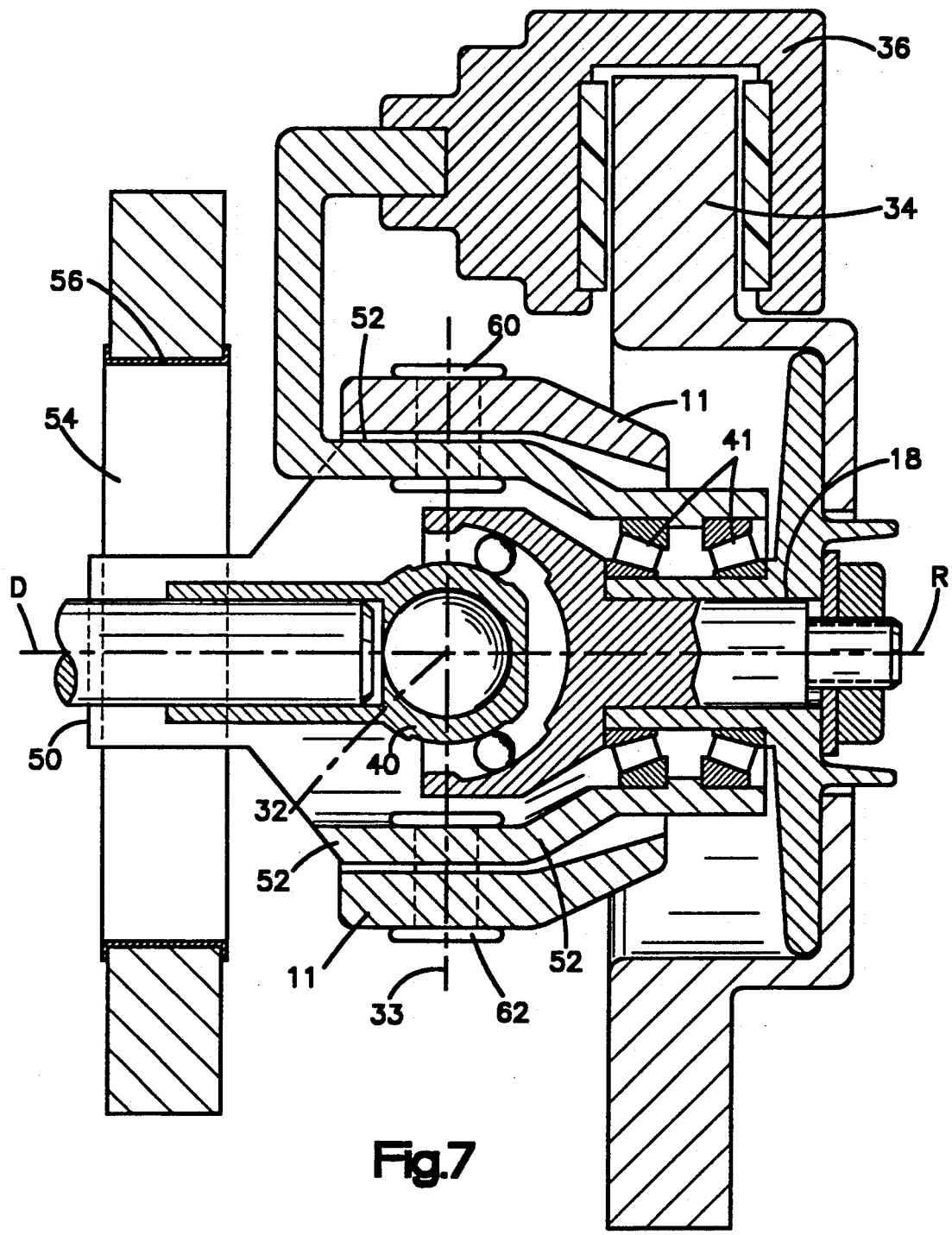
FIG. 7 presents a detailed view of the cross section defined by the line shown in FIG. 6.

The top view of this assembly is presented in FIG. 7, wherein the slot 54 may be better seen. The slot 54 is shown lined with a bushing 56. The primary essential element of the present invention may be seen in this view; the wheel assembly includes pivot pins 60 and 62 on either side of the housing 52 so that the housing pivots on a horizontal axis that passes through the center of rotation 32 of the universal joint 40 at substantially the same point as does the steering axis, the drive shaft axis D, and the wheel rotation axis R. As the wheel is turned for cornering, the camber control arm 50 slides within the confines of the slot 54, the vertical dimension of the slot restricting the motion of the camber control arm 50 preferably to motion in a plane horizontal to the ground, thereby maintaining a camber angle of zero throughout the entire range of turning angles. To effect this action, the wheel assembly may rotate to a degree limited by the dimensions and profile of the slot 54 about the camber pivot axis 33. In this view one can also see the brake disk 34 and a representation of the brake caliper 36.

Referring again to the schematic nature of the drawings, the suspension yoke 26 of a practical production design would be curved to provide the sliding contact between the camber control arm 50 with the slot 54 to be on constant surfaces of the control arm and providing a constant moment arm relative to the horizontal pivot pins 60 and 62 that establish the camber pivot axis 33. Additionally, in a practical production design flexible coverings or 'boots' would be provided to protect the slot and the universal joint from road debris and dirt. These enclosing protective boots are not indicated in the drawings as they would reduce the clarity of the drawings and they are not essential to understanding the operation of the invention.

Another view of the suspension assembly is presented in FIG. 8. The view is from the inboard side of the right front wheel. In this figure, the relationship between the steering axis 12, which is shown rearwardly inclined, the camber pivot pins 60 and 62 that establish the camber pivot axis 33, the suspension spindle 11, the axle housing 52, and the camber control arm 50 are much more clearly seen. The view is from the inboard side of the assembly and shows that the horizontal pivot pins 60 and 62 allow free motion of the wheel about a substantially horizontal axis 33, which we have called the camber pivot axis, and this motion is restricted only by the confinement of the camber control arm 50 within the camber control slot 54. Further, the camber pivot axis need not be precisely horizontally oriented to achieve the desired effect. In the preferred mode, the camber control slot is straight and parallel with the road surface to maintain a zero camber angle throughout the entire range of a turn. It is within reason to believe that a camber control slot having some curvature or some other profile, while remaining substantially parallel to the road surface may be advantageous in specific suspension design applications. Profile, as used herein may include contour relative to the horizontal and inclination relative to the horizontal.

The relationship between the turning angle and the position of the camber control arm in the camber control slot as the wheel is turned is more clearly shown in FIGS. 9, 10, 11, and 12. FIG. 9 shows a schematic top view of the right front wheel of FIG. 4 steered for straight-ahead driving; the corresponding inboard side view is shown in FIG. 10 where it can be seen that the steering axis 12 is inclined. The camber control arm 50 is in approximately the center of the length of the camber control slot 54. The camber angle is zero, as shown by the view of the wheel 14 and tire 16 in FIG. 9. When the wheel is turned, as in a left turn shown in similar views in FIGS. 11 and 12, the camber control arm 50 slides within the camber control slot 54, which is here shown as straight and parallel with the ground. The camber control slot maintains or controls the camber angle by confining its motion in the vertical direction, causing the axle housing to pivot on the horizontal pivot pins 60 and 62. The result shown in FIG. 10 is that the zero camber angle is maintained throughout the range of turning angles.

It should be appreciated that suspension designers may not find that providing a zero camber angle through the complete range of turning angles may not be their ultimate goal. The camber control slot 54 may be either contoured or straight, as shown in FIG. 8, or inclined to the horizontal to meet specific design requirements. The essential benefit is that the camber angle may be controlled as a function of turning angle and that this is accomplished by providing pivot means in the suspension in a substantially horizontal axis that is longitudinal to the vehicle.

Figure 13:
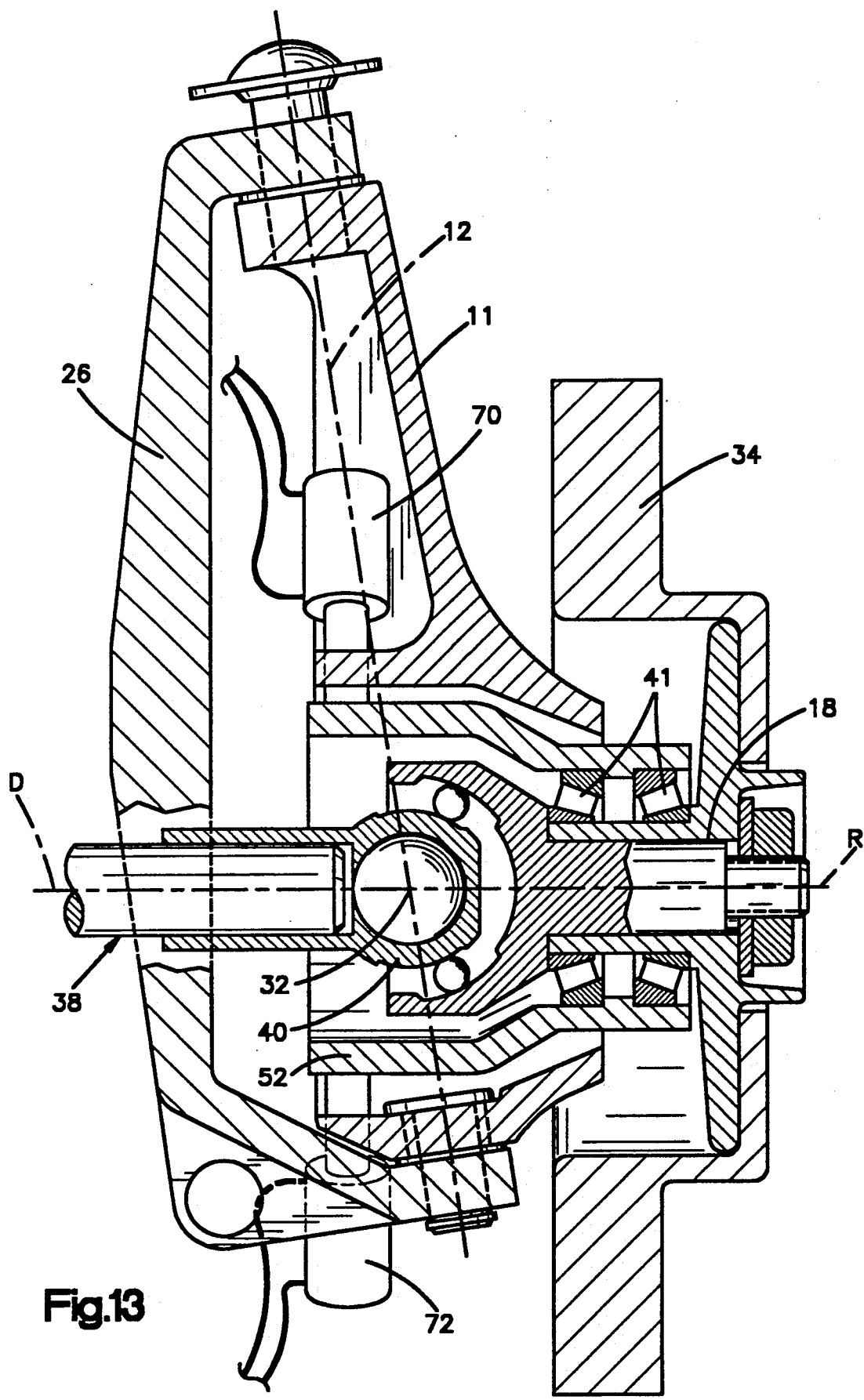
FIG. 13 presents a view similar to that in FIG. 5, but wherein an alternative means is provided to maintain the desired camber through all turning angles.

Once the camber pivot means is provided, means other than the camber control arm thus far discussed may be used to control the camber angle. One such other means is illustrated in FIG. 13. In this figure, the camber control arm is not present, its function being performed by an upper force transducer 70 and a lower force transducer 72, said transducers being offset in a lateral direction from the camber pivot axis 33 of the invention to provide a moment arm by which rotational motion about said pivot axis may be controlled. In combination, these two force transducers, which may be for example, hydraulic cylinders or other devices that produce a forceful motion in response to pressurization with a hydraulic fluid, maintain and control the camber angle when they are properly pressurized. The pressures may be rapidly changed under the influence of control means not within the scope of this invention but wherein the pressure may be made a function of turning angle or other detectable variable or resultant of a combination of variables that may be selected as a controlling variable. In this embodiment, the suspension yoke 26 may also be eliminated, if desired.

As an alternative to using hydraulic devices as the upper and lower force transducers 70 and 72 to exert controlled forces to maintain and control camber angle, it may be feasible to use piezo-electric devices that would expand in the required direction upon the application of increased voltage. One would expect this alternative would mean either the required travel distance is made very small, as by reducing the moment arm significantly, or the piezo-electric material may be stacked to generate increased travel distance. Linear servomotors may also prove useful in this service if they are made capable of providing sufficient force. Electrical energy required for driving said electromotor device would be provided and controlled by electrical control means responsive to one or more detectable variables associated with the motion of the vehicle, which means are beyond the scope of the present invention.

It should be quite clear to one skilled in the art of suspensions for dirigible automobile wheels that the present invention, which has been made with a driven dirigible wheel in mind, for that is the direction the automobile industry has taken in recent years, is equally useful for non-driven dirigible wheels, as is generally the case with rear-wheel drive vehicles. An advantage is present in the fact that the same parts could be used interchangeably in automobile models having front-wheel drive and other models having rear-wheel drive.

While I have shown and described only two embodiments in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. In a dirigible wheel axle assembly for supporting a wheel of a vehicle, said wheel, when supported on said axle assembly, having a rotation axis, a caster angle, and a camber angle, said axle assembly comprising:
  (a) a suspension spindle rotatably mounted to rotate about an inclined but substantially vertical steering axis;
  (b) an axle housing attached to said spindle;
  (c) a stub axle for supporting said wheel for rotation about said rotation axis of said wheel;
  (d) means for rotatably securing said stub axle to said axle housing;
and wherein said axle assembly may also include drive means including a universal joint, said drive means comprising a connection to a drive shaft that is connected to a source of motive power to rotate said shaft about an axis thereof and thereby to rotate said wheel;
  wherein the improvement comprises of attaching said axle housing to said spindle by means that allow rotation of said axle housing on a substantially horizontal camber pivot axis that intersects at substantially the same point the said steering axis and the said rotation axis of said wheel and, when a drive means is present, also said axis of said drive shaft;
  and wherein the improvement further comprises providing control means to restrict and control the rotation of said axle housing on said camber pivot axis, thereby providing control of said camber angle independent of any steering axis inclination and caster angle.

2. The improvement recited in claim 1 wherein:
  said suspension spindle is mounted in a suspension yoke and
  said control means comprises a camber control arm rigidly attached to said axle housing and cooperatively slideably engaging a substantially horizontal slot in said suspension yoke, said slot having the features of position and profile, wherein the position of said slot (and thus the engaged control arm) relative to the camber pivot axis effects the camber angle and wherein the profile of said slot controls the camber angle by means of said control arm as the dirigible wheel is turned on said steering axis.

3. The improvement recited in claim 1 wherein said control means comprises an electromotor device interconnecting said axle housing with said suspension spindle, electrical energy required driving said electromotor device is provided and controlled by electrical control means responsive to one or more detectable variables associated with motion of the vehicle.

4. The improvment recited in claim 1 wherein: said control means comprises a hydraulic device interconnecting said axle housing with said suspension spindle, the hydraulic pressure driving said hydraulic device is provided and controlled by hydraulic control means responsive to one or more detectable variables associated with the motion of the vehicle.

5. The improvement recited in claim 4 wherein said hydraulic device comprises a piston slidably operating within a cylinder under the influence of a pressurized hydraulic fluid.

6. The improvement recited in claim 5 wherein said piston is a double-acting piston.

* * * * *